Jan. 17, 1956     L. A. PHILIPP     2,730,868
MULTIPLE TEMPERATURE REFRIGERATING APPARATUS
Original Filed Oct. 12, 1951     6 Sheets-Sheet 1

INVENTOR.
LAWRENCE A. PHILIPP
BY
Ralph E. Baker
ATTORNEY

Jan. 17, 1956  L. A. PHILIPP  2,730,868
MULTIPLE TEMPERATURE REFRIGERATING APPARATUS
Original Filed Oct. 12, 1951  6 Sheets-Sheet 2

INVENTOR.
LAWRENCE A. PHILIPP
BY Ralph E. Baker
ATTORNEY

Jan. 17, 1956   L. A. PHILIPP   2,730,868
MULTIPLE TEMPERATURE REFRIGERATING APPARATUS
Original Filed Oct. 12, 1951   6 Sheets-Sheet 3

INVENTOR.
LAWRENCE A. PHILIPP
BY
Ralph E. Baker
ATTORNEY

Jan. 17, 1956 L. A. PHILIPP 2,730,868
MULTIPLE TEMPERATURE REFRIGERATING APPARATUS
Original Filed Oct. 12, 1951 6 Sheets-Sheet 5

INVENTOR.
LAWRENCE A. PHILIPP
BY
Ralph E. Baker
ATTORNEY

Jan. 17, 1956  L. A. PHILIPP  2,730,868
MULTIPLE TEMPERATURE REFRIGERATING APPARATUS
Original Filed Oct. 12, 1951  6 Sheets-Sheet 6

INVENTOR.
LAWRENCE A. PHILIPP
BY
Ralph E. Baker
ATTORNEY

United States Patent Office 2,730,868
Patented Jan. 17, 1956

2,730,868

MULTIPLE TEMPERATURE REFRIGERATING APPARATUS

Lawrence A. Philipp, Detroit, Mich., assignor to Nash-Kelvinator Corporation, Detroit, Mich., a corporation of Maryland Original application October 12, 1951, Serial No. 251,052. Divided and this application November 12, 1952, Serial No. 319,882

3 Claims. (Cl. 62—6)

This invention relates to refrigerating apparatus and more particularly to such apparatus in which multiple temperatures are maintained.

One of the objects of my invention is to selectively maintain multiple temperatures in a refrigerator in a new and improved manner.

Another object of my invention is to insure the proper flow of refrigerant in a secondary refrigerating system to thereby maintain a constant temperature therein.

Another object of my invention is to provide in a refrigerator a refrigerating arrangement for maintaining multiple temperatures therein which includes a primary refrigerating system and a secondary refrigerating system which utilizes the primary system to condense evaporated refrigerant therein and to control the flow of refrigerant in the secondary system independently of the refrigerating action of the primary system and to insure the maintenance of such control.

Another object of my invention is to control automatically the effective condensing area of the secondary refrigerating system condenser.

Another object of the present invention is to provide an improved primary-secondary refrigerating system in which the temperature of the primary system may be changed for fast freezing without decreasing the temperature of the secondary system evaporator below a desired temperature for a food storage compartment.

Another object of the invention is to provide an improved secondary refrigerant circuit in which refrigerant circulation between a secondary evaporator and a heat exchanger condenser is controlled in response to the pressure thereof so that the temperature of the secondary evaporator will remain above the temperature which would cause freezing of foods stored in a food storage compartment.

Another object of the invention resides in the arrangement in a secondary refrigerant circuit of a valve responsive to pressure in the circuit to establish a certain temperature for the secondary evaporator by controlling the effective condensing area of a secondary condenser.

Another object of my invention is to provide a two-door, two-compartment refrigerator and to selectively control the temperatures in each compartment while maintaining a temperature differential therebetween in a new and improved manner.

Another object of the invention is to provide an improved refrigerator having refrigerating systems arranged for efficiently cooling and maintaining several compartments at respectively different temperatures and for collecting and disposing of excess moisture of the air of one of the compartments to effect a desired humidity therein for temperatures above freezing temperature for preservation of certain foods.

Another object of the invention is to provide an improved arrangement of refrigerator units including a secondary refrigerating system arranged to cool a food storage compartment and a high humidity compartment to different temperatures and at the same time periodically collect and remove moisture from the air of the food storage compartment to avoid high humidity and accumulation of excessive moisture therein.

Another object of the invention is in the arrangement of a secondary evaporator coil and cabinet such that sections of the coil effect different desired refrigerating functions efficiently.

Another object of the invention is to provide for adjustment of the effective refrigerating capacity of the secondary system so that in the event any frost collects on a moisture collector of the system it will melt during the off phase of the refrigerating cycle.

Another object of the invention resides in the provision of an improved arrangement of refrigerating apparatus units and in the provision of a control for regulating temperatures and humidities in both food storage and high humidity compartments of a refrigerator cabinet for ready adaptation of the refrigerator to different climates.

Another object of the invention resides in an improved arrangement within a refrigerator cabinet for draining moisture collected from the air of a food storage compartment to a moisture receiver located within a high humidity compartment formed by a removable bin within the cabinet.

Another object of the invention is to provide in primary-secondary refrigerating systems of multi-temperature household refrigerators for the maintenance of a substantially constant temperature of the secondary evaporator without danger of so-called vapor lock occurring in the secondary system.

Another object of the invention is to provide an improved arrangement of refrigerator units and cabinet compartments to effect efficient vaporization of collected water so as to eliminate need of emptying drip pans.

Another object of the invention is to provide an improved arrangement of refrigerator units to collect water in a vaporizing, flue communication chamber wherein vaporization is induced both by heat of the system and by system induced circulation of room air through the vaporizing chamber.

Further objects and advantages of the present invention will be apparent from the following description, reference being had to the accompanying drawings, wherein preferred and modified forms of the present invention are clearly shown.

In the drawings:

Fig. 3 is a fragmentary, vertical sectional view of the refrigerator, taken along the line 3—3 of Fig. 1;

In accordance with my invention, I provide a two-door, two-compartment household refrigerator wherein an upper compartment is utilized for freezing and the storage of frozen foods and the lower compartment provides for the storage of foods at temperatures above the freezing point of water. This refrigerator is provided with independent controls so that either or both of the compartments may be operated at any desired selected temperature. Preferably, the frozen food compartment temperature is maintained sufficiently low for rapid freezing of ice and foods and this compartment is refrigerated by a primary refrigerating system of the conventional type which includes the customary control which is well known in the art and is adjustable by merely rotating the control dial to vary the operating periods of the refrigerating apparatus so as to compensate for changes in environment temperature, various climates, and the various heat loads which may be applied to the compartment for quick freezing. This control may be set to increase the running time of the apparatus so that foods to be frozen may be brought to a frozen condition in faster time than if the control were permitted to remain in what is known as normal operating position. The food storage compartment is preferably cooled by a secondary refrigerating system which is in contact with the primary system to evaporate the gaseous refrigerant of the secondary system. The secondary system is provided with a control valve which controls the flow of liquid refrigerant from the secondary condenser to the secondary evaporator and this control valve is manually adjustable so as to control the amount of liquid which is permitted to flow to the secondary evaporator so that when the primary system is operating for long periods of time, the temperature in the secondary system may be maintained at the desired temperature by the adjustment of the control valve. Likewise, when there is a change of environment temperature or the refrigerator is moved to another climate which may tend to cause the normal operation of the machine to be greater than other conditions, the secondary system control valve may be set to meet that condition so that the temperature in the secondary system will not be such that the cooling surfaces continue to collect frost if at all thereon. If desired, the same may be set so that the cooling surfaces of the secondary system collect frost during the running period of the apparatus but permits frost to melt off during the off-phase of the apparatus. In order to prevent freezing of food stuffs stored in the food storage compartment, I have arranged so that the control valve in the secondary system limits the flow of liquid refrigerant from the secondary condenser and arranged the same so that the valve is pressure operated, and when the temperature in the secondary system is at a certain desired point, the valve controls the flow of liquid to the secondary system and this at times causes liquid refrigerant to back up in the secondary refrigerant condenser to thus block off a portion or all of the effective condensing area of the secondary condenser so that the gas which has evaporated in the secondary system cannot be readily condensed, as more gas is being produced than there is area in the condenser to condense such gas as fast as it accumulates. This takes place to prevent the temperature from becoming too low in the secondary evaporating portion and when the temperature starts to rise in the secondary evaporating system due to heat leakage in the refrigerator or the insertion of warm articles therein to be refrigerated, the pressure in the secondary system starts to increase and causes the control valve to allow more liquid to flow into the secondary evaporator, thus allowing more effective area for condensing in the secondary condenser, as the level of liquid therein is lowered to thus allow a more rapid rate of condensation and a consequent cooling to maintain substantially constant temperatures in the secondary system. In order to insure maintaining such temperatures in such positive control of the flow of liquid in the secondary system, I have provided a conduit which arranges for open communication between the inlet side of the secondary condenser and the outlet side of the control valve so as to prevent any possibility of vapor lock in the valve housing which might take place due to the expansion of refrigerant in said housing which may tend to prevent liquid from passing through the valve orifice.

In addition, I have arranged the secondary cooling system so that one portion thereof is positioned within the food storage compartment where it presents a relatively cold surface as compared with the walls of the compartment, so that any moisture that is condensed out of the circulating area in the food storage compartment is condensed on the portion of the secondary evaporator located in the food storage compartment. This condensation takes place on a plate made of such material such as stainless steel that will not be affected by or caused to crack in spots by low temperatures and the application of moisture, as is vitreous enamel used on surfaces throughout storage compartments in household refrigerators. Furthermore, this moisture may be conducted to the warmer walls of the food storage compartment into the lower part of the refrigerator and from there removed or later evaporated by part of the heat emitting parts of the apparatus and the environment temperature surrounding the refrigerator.

Referring to the drawings and first to Figs. 1 to 11 inclusive, there is shown a refrigerator of the household type, having a cabinet designated in general by the numeral 20. The cabinet 20 includes an outer sheet metal casing 22, an upper sheet metal container or liner 24, and a lower sheet metal liner 26. Preferably, heat insulation 28 is provided between the casing 22 and the liners 24, 26 to decrease heat leakage into the cabinet. Also, the heat insulation 28 is preferably interposed between liners 24, 26 to insulate them from each other.

The lower liner 26 forms inner wall surfaces of a food storage compartment 30, and upper liner 24 forms inner wall surfaces of a second or freezing compartment 32. These liners 24, 26, and the casing 20, are preferably box-shape having flanged edges at the front of the cabinet which are spaced apart to decrease heat transfer therebetween. The flanged edges of the liners 24, 26 and the adjacent corresponding flanged edges of the casing 22 are spanned preferably by heat breaker strips 34 which close the space between the flanges and give a finished appearance to the cabinet without appreciable conduction of heat between the parts. Preferably, individual doors 36, 38 are provided respectively for the food storage compartment 30 and the freezing compartment 32 and, preferably, the doors are hinged to one side of the cabinet.

The refrigerator includes a primary refrigerating system evaporator 40 and a secondary refrigerating system evaporator 42. The evaporator 40, commonly referred to as a freezing evaporator, is arranged to absorb heat principally from compartment 32, whereas the secondary system evaporator 42 is arranged to absorb heat principally from the food storage compartment 30.

In the present construction and arrangement of the refrigerator units, the evaporator 40 includes the liner 24 around which the coil or tube, is wrapped in contact with the top, bottom and sides of the liner to effect efficient heat conduction between the parts. The evaporator coil 40 may be clamped, cemented, or be otherwise held in efficient heat-conducting relationship to the walls of the liner 24 which thus provides an extended heat-absorbing surface for the evaporator, as well as a refrigerated storage container wherein such things as ice cubes may be made and stored, and frozen foods kept at proper temperature.

On the rear wall of liner 24 is mounted a refrigerant accumulator 44 which has an inlet connected to the outlet of evaporator coil 40 and an outlet which is communicatively connected to a refrigerant motor-compressor unit 45 by a refrigerant return line 46.

A spacer 48 spaces the insulation 28 from the liner 24 and from evaporator 40 to allow space for frost to collect on the outer surface of the liner and evaporator. The spacer 48, preferably in the form of a pervious liner or wire mesh, allows moisture-laden air, which may leak into the casing through unsealed joints and through door latch striker plate clearance holes, to flow to and deposit the moisture on the evaporator 40 and liner 24 so as to avoid frost forming on and decreasing the efficiency of the insulation 28.

Disposed directly below the liner 24 and evaporator 40 is a drip pan 50 which is supported on the insulation on the top wall of lower liner 26. A drain tube 52 leads down from the pan 50 for passage of defrost water from the drip pan 50 into compartment 30 and if desired may be conducted by any suitable means down the walls thereof to a removable drip receiver 54 near the bottom of the cabinet.

The primary refrigerating system includes the freezing evaporator 40, motor-compressor unit 45, and a refrigerant condenser 58. Liquid refrigerant is conveyed by a metering or capillary tube 60 from condenser 58 to evaporator 40 where heat is absorbed by the refrigerant after which the refrigerant in gaseous state is withdrawn from the accumulator 44 and delivered to the motor-compressor 45 through return conduit 46.

A temperature-responsive control 62 is provided to control the temperature of evaporator 40. The thermostat 62 includes a bulb 68 preferably placed in contact with the evaporator 24 so as to be responsive to changes in temperatures of the evaporator. The thermostat may be of the same type now in use on household refrigerators for controlling the temperatures in such refrigerators which may be adjusted to vary the periods of operation of the motor-compressor units in the usual manner to thus provide for fast freezing when desired to operate for shorter periods of time when fast freezing is not desired. The control or thermostat 62 is connected across the main lead wires 70, 72 which connect to the motor-compressor unit 45 and to a suitable source of electric power, such as the usual household 110 v. line. Thus in the usual manner, the thermostat controls cycling operation of the motor-compressor unit 45 in response to temperature changes of evaporator 40 to maintain a desired or selected evaporator temperature.

The cabinet rear wall is offset inwardly or angularly disposed preferably adjacent the bottom thereof to provide a machinery compartment 74 to house the motor-compressor unit 45. Preferably the machinery compartment 74 is formed by the cabinet inclined rear wall, the lower side portions 76 of casing 22, and by a flue 78 which also forms a part of the condenser 58. Heat insulation 80 is preferably provided between the inclined cabinet wall and the motor-compressor unit 45 to aid further in preventing heat generated by the motor-compressor unit 45 from leaking into the interior of the cabinet.

Preferably, the flue 78 extends across the back of the cabinet in spaced relation thereto and from the bottom of the cabinet substantially halfway up the back thereof. The refrigerant condenser 58 in the form of a sinuous coil is preferably secured to the inner surface of the flue 78 which presents a large heat transfer surface to atmosphere for cooling purposes and is preferably extended up the back of the flue in contact therewith as shown, for example, in Fig. 2. At the bottom of the cabinet, an opening 82 is provided therein for passage of air into the machinery compartment 74 wherein the air flows upwardly over the motor-compressor and condenser and up the flue 78 to carry away heat of condensation and also heat generated by operation of the motor-compressor unit 45.

In the interests of suppressing noise, the motor-compressor unit 45 is preferably resiliently mounted. In the present case, the unit is mounted on a spring 79 which is supported on a bracket 81 that is secured to the flue 78, but it will be understood that the unit may be mounted in any desired manner.

Figure 1:
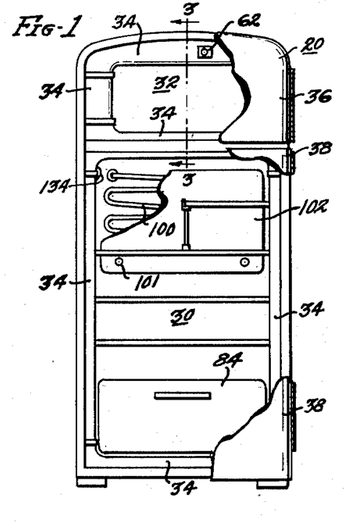
Fig. 1 is a front view of a household refrigerator embodying features of my invention and showing a portion thereof broken away.
Figure 2:
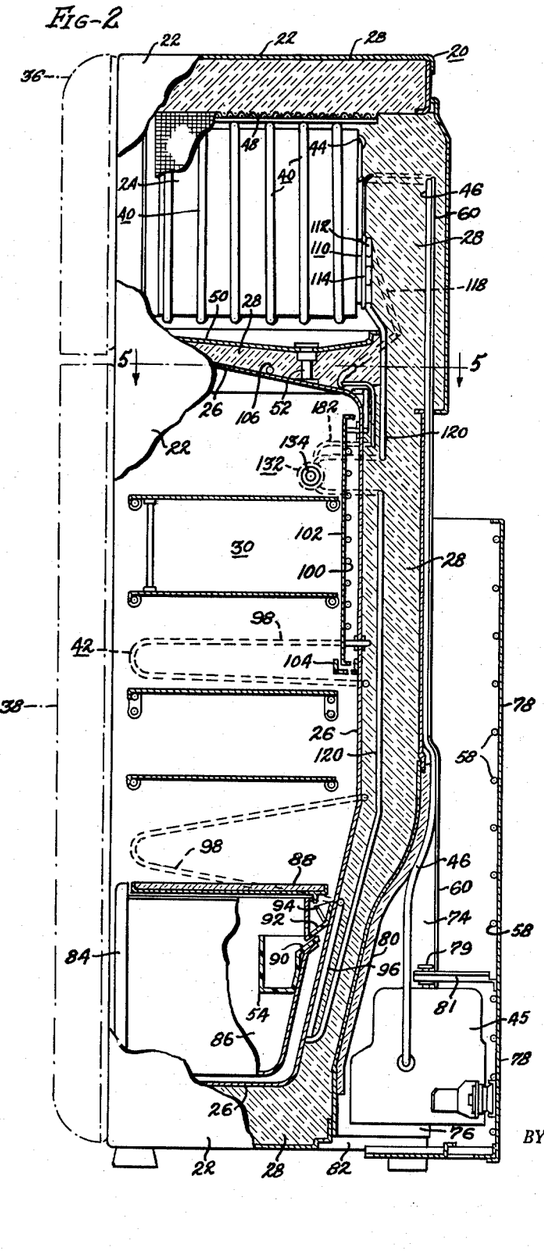
Fig. 2 is a side view of the refrigerator showing a portion thereof broken away.

Within the refrigerator cabinet adjacent the bottom thereof, a sliding bin or drawer 84 forms the walls of a high humidity compartment 86 which is desirable principally for storage and preservation of fresh vegetables and fruit. When bin 84 is entirely within the cabinet, the top of the bin is closed by a closure member or air baffle 88 which also serves as the lowermost shelf of the food storage compartment 30. This closure member 88 may be made of any suitable material, such as glass or plastic material, but more important is made impervious so as to prevent circulation of air between compartment 30 and compartment 86 whereby to effect high humidity within the bin 84. As shown in Fig. 2 the bin 84 is spaced from the sides, rear, and bottom of liner 26 and from door 36 to allow limited circulation of air around the bin. Carried by and within the bin 84 is the removable drip receiver 54 which is mounted on the bin rear wall, as shown. In the bin rear wall an opening is provided through which a lip 90 of the drip receiver 54 projects beneath a spout 92 which is provided on the liner inclined wall portion to direct defrost water into drip receiver 50. The spout 92 is formed out of one side of the trough 94 which may be made of channel section or otherwise made to provide a suitable water collecting trough. This trough is secured to, and extends along, the sides and back of the liner 26 to collect defrost water which, as previously mentioned, runs down the liner inner surfaces on defrosting of system.

Figure 11:
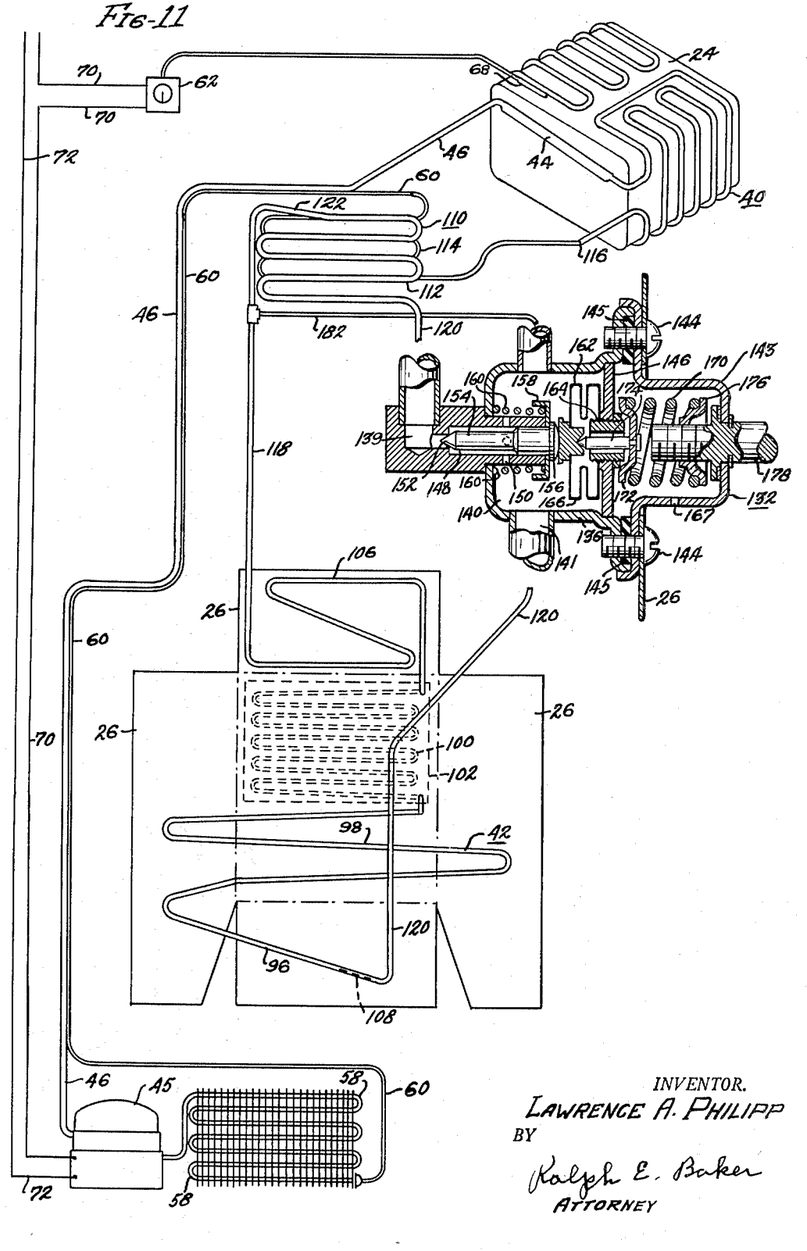
Fig. 11 is an illustration principally diagrammatic of a refrigerating system and controls therefor of the refrigerator.

The evaporator 42 of the secondary system is preferably in the form of a sinuous coil which, in accordance with my invention, I arrange so that sections thereof have different cooling functions. For example, the coil 42 has a lower section 96 arranged to cool the high humidity compartment 86, an intermediate section 98 arranged to cool the food storage compartment 30, and a plate section 100 arranged to cool the food storage compartment 30. The compartment 86 is refrigerated to the desired temperature for fruits and vegetables by a single run of coil section arranged to extend up and across the slanted back of the liner 26 as is best seen in Fig. 11. At or near the top of the liner slanted back, the coil section 96 extends forwardly along one side of the liner to begin section 98, or the food storage compartment cooling section of the coil. Evaporator section 98 extends sinuously along the back and sides of liner 26 against the outer surface thereof to provide proper cooling capacity for the lower region of the food storage compartment. The evaporator sections 96, 98 of the coil may be held to the outer surface of the liner 26 by any suitable means such as, for example, bituminous cement.

At a point substantially midway between the top and bottom of liner 26, the evaporator coil 42 projects through the liner rear wall into the food storage compartment 30 to begin the moisture-collecting or plate cooling section 100 of the coil. Preferably, the cooling section 100 is sinuously formed and arranged such that its runs extend horizontally across the food storage compartment substantially to the opposite side walls of liner 26. The coil section 100 is secured to a plate 102 which provides added heat absorbing surface for said section so as to present a large surface to the air of the food storage compartment. Plate 102 is preferably positioned vertically in the cabinet in front of coil section 100 and extends substantially to the liner side and top walls. Spacers and bolts 101 may be used to mount the plate on the rear wall of liner 26 in spaced relation thereto to permit air flow on opposite sides thereof. Directly beneath the lower edge of plate 102 is a moisture-collecting trough 104 which has an outlet directed to discharge defrost water onto the rear wall of liner 26 for ultimate disposal in the removable drip receiver 54.

The cooling capacity of the secondary cooling section 100 is made sufficiently large, as represented by the number of loops thereof to refrigerate the food storage compartment air to the desired temperature without any appreciable collection of frost if any on the cooling section or on plate 102. As a result, on the on-cycle of the system, moisture in the air in the food storage compartment condenses on the cooling section 100 and its plate 102 and the condensate runs into trough 104, down liner 26 into trough 94 and from trough spout 92 into the removable drip receiver 54. If frost does form on plate 102 it melts off when the primary system ceases operation. Thus, for each cycle of cooling by cooling section 100 there is a cycle during which moisture is condensed from the air of the food storage compartment to keep the air therein at a desired relative humidity best suited for the type of foods usually stored in said compartments.

The moisture-collecting evaporator section 100 extends through liner 26 to begin another section 106 of the coil which I arrange to aid evaporator coil section 100 in cooling the upper region of the food storage compartment 30. To this end, the coil section 106 is arranged against and secured to the outer surface of the top wall of liner 26.

Preferably, an ebullator 108 is provided in the lower end of evaporator section 96 to insure ebullition and resultant circulation of the refrigerant in the secondary system. For a more detail description of the ebullator and its function, reference may be had to my patent entitled "Refrigerating Apparatus" No. 2,361,792.

A heat exchanger 110 transfers heat absorbed by the secondary refrigerating system to the primary system and comprises, in general, a refrigerant condenser 112 and a refrigerant evaporator 114. The heat exchanger evaporator 114 is in or forms part of the primary refrigerating system and the heat exchanger condenser 112 is in or forms part of the secondary system. The heat given up by the refrigerant of the secondary system at condenser 112 is absorbed by refrigerant passing through and vaporizing in the heat exchanger evaporator 114 for ultimate dissipation to atmosphere by condenser 58 of the primary system.

Preferably, the heat exchanger condenser 112 and evaporator 114 are sinuous coils or tubes arranged in contact with each other substantially throughout their length. One end of evaporator coil 114 is connected to the inlet end, as at 116, of the freezing evaporator 40 and the other end of evaporator coil 114 is connected to the capillary or refrigerant metering tube 60. A conduit 118 connects the outlet end of the secondary coil section 106 to the inlet of the heat exchanger condenser tube 112 which at its other end is connected by a conduit or standpipe 120 which connects to the lower end of evaporator section 96. An inlet portion 122 of the heat exchanger condenser 112 is inclined downward to the first run of the condenser so as to prevent back flow of liquid into line 118.

Figures 4, 7:
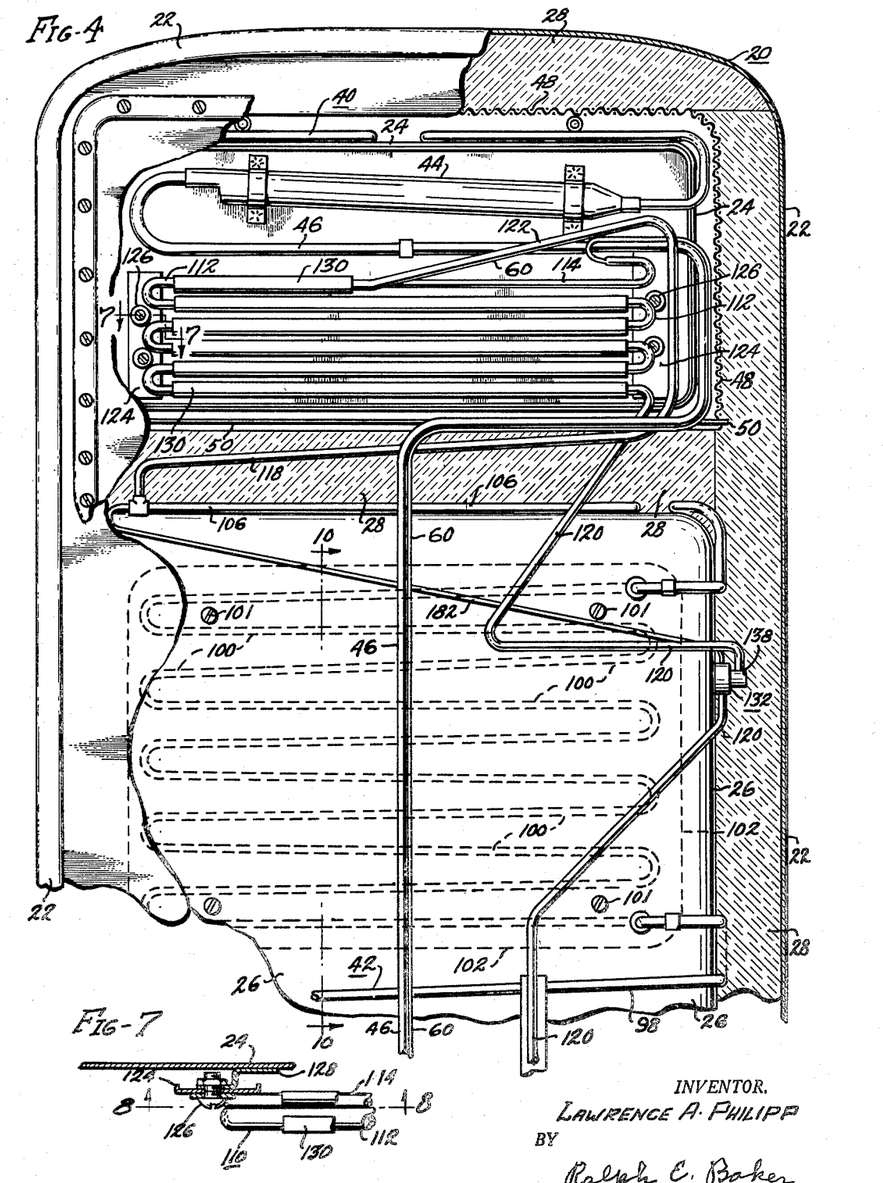
Fig. 4 is a fragmentary, rear view of the refrigerator having parts broken away.
Fig. 7 is a horizontal, sectional view of another detail of the refrigerator, taken along the line 7—7 of Fig. 4.
Figure 5:
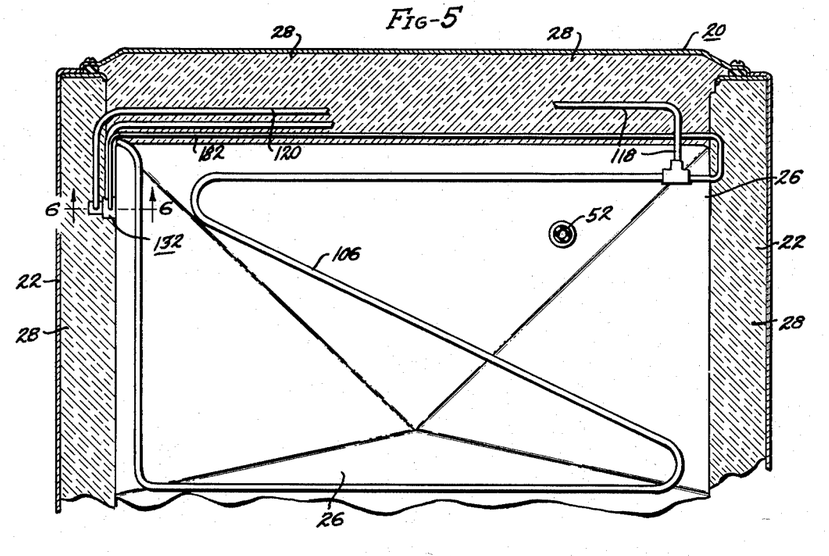
Fig. 5 is a horizontal, sectional view of the refrigerator, taken along the line 5—5 of Fig. 2.
Figure 6:
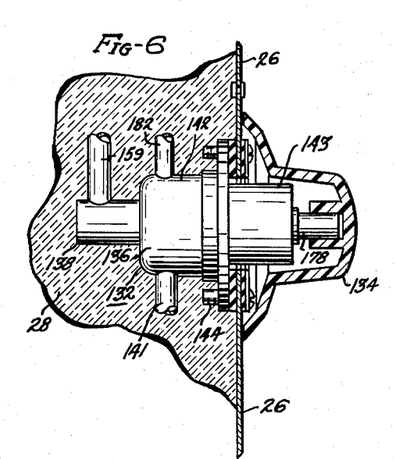
Fig. 6 is a sectional view of a detail of the refrigerator, taken along the line 6—6 of Fig. 5.
Figure 8:
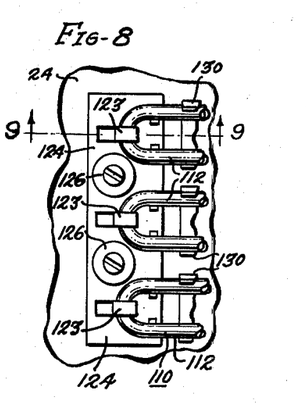
Fig. 8 is a fragmentary, rear view of the refrigerator, taken along the line 8—8 of Fig. 7.
Figure 9:
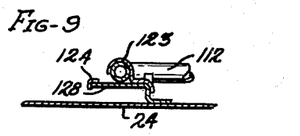
Fig. 9 is a cross-sectional view, taken along the line 9—9 of Fig. 8.
Figure 10:
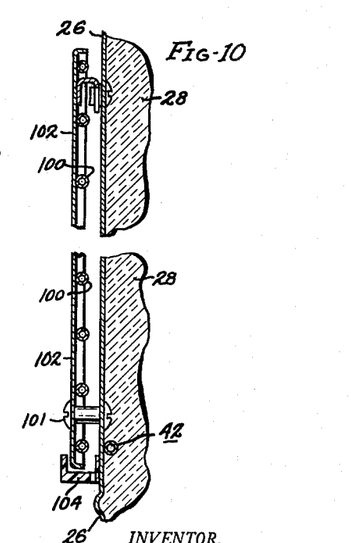
Fig. 10 is a vertical sectional view of the refrigerator, taken along the line 10—10 of Fig. 4.

With particular reference to Figs. 4 and 7, the heat exchanger condenser 112 and evaporator 114 are shown mounted as a unit on the back of evaporator 40 below the accumulator 44. The condenser 112 and evaporator 114 are arranged such that the runs thereof are in the same vertical plane and such that the vertically spaced runs extend horizontally. End loops of the condenser 112 are preferably secured, such as by tabs 123, to upright, end mounting plates 124 out of which the tabs may be formed. Plates 124 are preferably secured by screws 126 to brackets 128 that are in turn welded to the rear wall of container 24. Elongated metal clamps 130 hold corresponding runs of the heat exchanger condenser 112 and evaporator 114 together and preferably extend substantially the entire length of said runs.

In the standpipe 120, I provide a control or pressure responsive valve 132 for controlling the temperature of the secondary evaporator 42 so that it remains above that which would cause freezing of foodstuffs in the food storage compartment 30. Preferably the valve 132 is mounted in a side wall of the cabinet toward the back thereof so as to be out of the way yet accessible as the valve has a manual adjustment rotatable knob 134 by means of which the low temperature of the evaporator may be selected and changed to suit existing conditions.

The valve 132 includes a casing 136 and a valve body 138. Valve body 138 has an inlet 139 connected to the outlet end of the heat exchanger condenser 112 and communicates with a chamber 140 in the casing 136 which has an outlet 141 connected to the upper end of the evaporator standpipe 120.

Preferably, the casing 136 is made of two cup members 142, 143 having outturned flanges secured together, such as by means of screws 144. A gasket 145 of suitable displaceable material, such as rubber, is provided between the cup flanges to seal the joint thereof. A partition or plate 146 is secured and sealed to an internal shoulder of cup 142 to form therewith the chamber 140.

Secured to and within one end of the chamber cup 142 is valve body 138, which has a passage 148 therethrough provided with transverse ports 150 discharging into the chamber 140. In valve body passage 148 is a valve seat port controlled by the conical end 152 of a needle valve 154 which has a stem reciprocally guided in the valve body. On its inner end, the valve stem is provided with a head 156 abutting which is a spring retainer 158 for one end of a helical coil spring 160. This spring 160 acts to move the valve 154 away from its seat, or toward open position.

In the chamber 140, a bellows 162 is provided to actuate valve 154 in response to changes in pressure acting thereagainst. Bellows 162 has one end sealed and secured by an open-ended tubular screw 164 to the plate 146 and has the other or free end carrying an abutment member 166 which engages the valve head 156. The interior of the bellows 162 is in communication with atmosphere through tubular screw 164, casing 132 and a port 167 in the side of cup 143.

On the other side of the plate 146 from the bellows chamber 140, cup 143 houses a spring 170 which opposes movement of the valve 154 by bellows 162. One end of spring 170 acts against a spring abutment 172 which carries a thrust pin 174 that extends through tubular screw 164 to engage the abutment member 166 carried by the free end of the bellows 162. The other end of spring 170 seats against an adjustable abutment 176 which is threaded onto a stem 178, the outer end of which has the hand knob 134. It will be seen that by turning the knob 134, the compression force of spring 170 may be changed and thus effect a corresponding change in the temperature of the secondary evaporator 42.

Further in accordance with my invention, I provide a by-pass 182 from pressure chamber 140 to the inlet of the heat exchanger condenser 112 to avoid possible development of so-called vapor lock in standpipe 120 of the secondary evaporator 42. In the present diagrammatic illustration, the by-pass 182 is in the form of a conduit which connects chamber 140 to the conduit portion 118 which connects the secondary evaporator outlet section 106 to the heat exchanger condenser 112.

In regard to the operation of my improved system, the motor-compressor unit 45 withdraws evaporated refrigerant from the evaporator 24 through the vapor return conduit 46 and compresses same and delivers it to the condenser wherein it is liquefied and from which it is delivered to the small evaporator 114 under the control of the small diameter or capillary tube 60. The refrigerant flows from the small evaporator 114 into the coil 40 of the evaporator 24 to the accumulator 44 whence the evaporated refrigerant enters the vapor return conduit 46 and the cycle is repeated. The operation of the motor-compressor unit is controlled by the standard thermostatic switch control 62 which is responsive to the temperature of the evaporator 24 and the bulb 68 may be placed directly in contact with the coil 40 or on the shell or liner portion 24 where the thermal bulb is directly responsive to the temperature of the evaporator to cause the thermostatic switch 62 to open and close the motor circuit at predetermined settings of the switch and in response to changes in temperature of the evaporator. This thermostat may be as all others now in use, wherein a dial is provided for setting the switch mechanism for controlling the temperature maintained in the evaporator 24. The dial may be turned to cause the motor to operate at longer or shorter intervals, as desired, as is well known in the art. When turned to operate at longer intervals than normal operation, as may be the case when a large load is applied to the freezing evaporator 24 for quick freezing, the system will continue to operate for longer periods on the on-phase than during normal operation. Likewise, the change of environment temperature may cause the motor to operate at longer on-phase periods than in a lower environment temperature.

The secondary system is arranged to refrigerate the food storage compartment and includes evaporator 42 and the condenser 112 which are connected on the down side by conduit 120 and on the up side or vapor side by conduit 118. Consequently, when evaporation takes place in the evaporator 42, the same moves upwardly throughout its entire passage into the conduit 118 into the condenser 112 wherein the gaseous refrigerant is liquefied by the primary evaporator 114 and from which the liquid refrigerant flows through the conduit 120 into the valve 132 which controls the further movement of the liquid in conduit 120 to the evaporator section 42. As will be noted, the valve chamber 140 is in open communication with the evaporator 42 and consequently the pressure in the evaporator as it increases applies its force on the bellows 162 tending to cause the valve proper 154 to move toward open position. Likewise, when the temperature in the evaporator 42 lowers, the pressure on the bellows 162 is less which tends to cause the valve proper 154 to engage its seat. When this takes place, liquid refrigerant in the condenser tends to back up throughout the length thereof to close off the condensing area of the secondary condenser 112. As will be noted, the secondary condenser 112 is formed in serpentine coil formation with the horizontal runs being vertically spaced so that as liquid is condensed therein it tends to fill up the coil of the condenser 112, and as the temperature reaches a certain point, the condenser is partly filled with liquid refrigerant thus leaving but a very small effective condensing area so that the gas leaving the secondary evaporator cannot all be condensed as rapidly as the refrigerant is vaporized in the secondary system, thus preventing any possibility of reducing the temperature in the secondary system below a desired point. The desired point is determined by the setting of the valve by the manually controlled dial knob. Once this valve is set, it will maintain constant temperature at the selected setting since the condenser is a very small diameter serpentine coil arrangement and cannot condense in the section which is filled with liquid and the setting of the valve controls the amount of liquid which may flow to the secondary evaporator 42, and the amount of liquid in the secondary condenser controls the amount of gaseous refrigerant which may be condensed in the secondary condenser to thus prevent the lowering of the pressure in the secondary condenser if the same were of larger dimensions having unlimited condensing area. Preferably, the secondary system is charged with a quantity of liquid refrigerant which is greater than the volumetric capacity of the secondary condenser 112 and consequently the backing up of liquid in the condenser 112 by reason of the operation of the valve will always be maintained to prevent the secondary evaporator from reaching too low a temperature which may cause freezing of food stuffs stored in the food storage compartment once the valve is set regardless of the operation of the primary system. Furthermore, this valve arrangement will enable the secondary system to operate at such desired temperature that will eliminate the collection and/or accumulation of frost on the secondary refrigerating surfaces or it may be set so that some frost may collect upon a portion of the secondary evaporating surfaces during the on-phase of the refrigerating cycle and melt it off during the off-phase of said cycle. In order to prevent a vapor lock in the valve chamber 140, I have arranged the bleeding conduit 182 which is in open communication with the chamber 140 or the outlet side of the valve on one end of the conduit 182 and on the other end is placed in open communication with the conduit 118 which is ahead of the inlet to the secondary condenser 112. Thus when liquid refrigerant passes by the needle 152 of valve 154, any expansion thereof will not cause a vapor lock to prevent liquid from continuing to flow past the needle valve, since the pressures on opposite ends of the condenser are immediately equalized.

Figure 12:
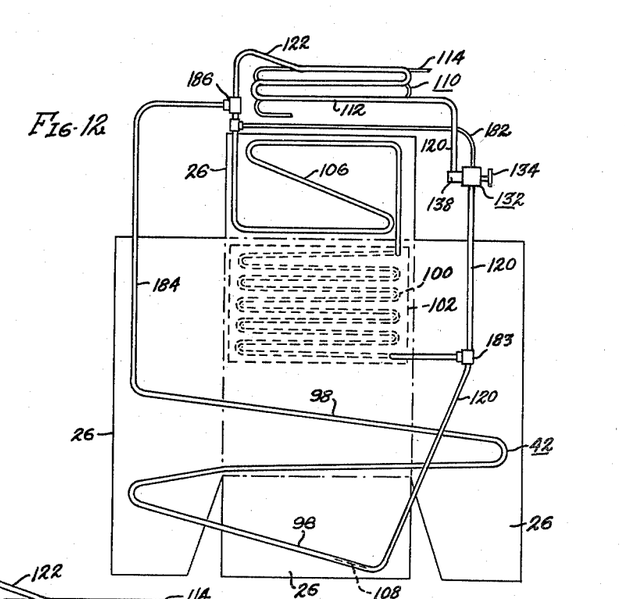
Figs. 12 and 13 are diagrammatic illustrations of modifications of the system of Fig. 11.

In the modification of Fig. 12 with respect to the previously described refrigerator, like elements have been given like characters of reference to avoid unnecessary repetitious description. The modification differs from the previously described refrigerator in the arrangement of portions or sections of the secondary refrigerating system evaporator. For example, in the system of Fig. 12, evaporator section 100 is connected in parallel instead of series circuit with the heat exchanger condenser 112, control 132, and evaporator sections 96, 98. This arrangement is accomplished by connecting the inlet of evaporator section 100 to the standpipe 120, such as by means of a fitting 183, and connecting evaporator coil section 98 to the inlet of the heat exchanger condenser 112 by a conduit portion 184 and fitting 186. By this arrangement it will be seen that liquid refrigerant in the standpipe is divided at fitting 183, some of the liquid refrigerant being conveyed directly to the secondary evaporator section 100, and some passing to the lowermost evaporator section 96.

Figure 13:
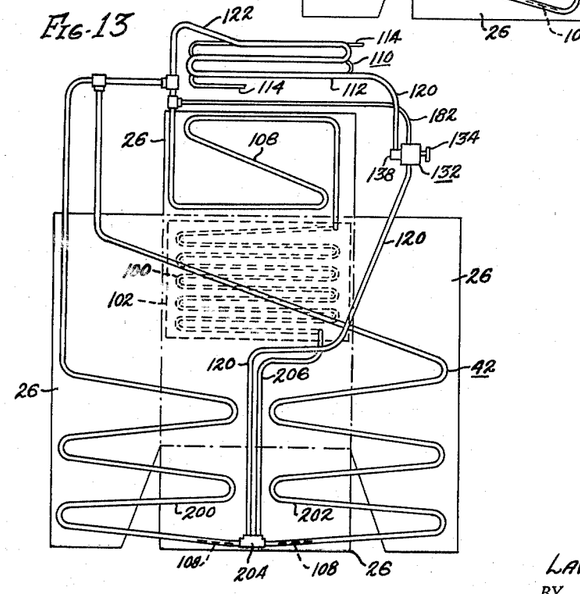

In the modification of Fig. 13, the secondary cooling system includes three parallel evaporators 100, 200 and 202 which are connected to a distributor or manifold 204 in standpipe 120. The manifold 204 is located at the bottom of liner 26 and is in the form of a fitting. Evaporator coils 200, 202 extend from the manifold 204 sinuously and upwardly along lower portions of the rear and sides of the liner. Preferably coils 200, 202 extend partway up the liner over an area of the region of the high humidity compartment and lower portion of the food storage compartment and then connect to the heat exchanger condenser 112. A conduit 206 connects manifold 204 to the inlet of evaporator 100.

The present application is a division of my pending application Serial No. 251,052, filed October 12, 1951, for Refrigerating Apparatus.

From the foregoing description it will now be understood that I have provided an improved refrigerator in which an improved arrangement of a secondary evaporator is such that sections thereof have the functions of efficiently cooling food storage and high humidity compartments and also remove excess moisture from the air of the food storage compartment. In connection therewith I have provided improved arrangements and means for disposing of the moisture removed from the air of the food storage compartment. Furthermore I have provided improved secondary systems and arrangements of evaporators thereof to improve refrigeration efficiency and also provide an arrangement to avoid the occurrence of so-called vapor lock in such systems.

Although preferred and modified forms have been illustrated, and described in detail, it will be apparent to those skilled in the art that various other modifications may be made therein without departing from the spirit of the invention or from the scope of the invention.

I claim:

1. Refrigerating apparatus comprising, a primary cooling means, a secondary volatile refrigerant circuit having a refrigerant condensing portion in heat exchange relationship with said cooling means and having two heat absorbing portions connected in parallel, a valve responsive to pressure in said circuit interposed between the outlet of said condensing portion and the inlet of said heat absorbing portion for controlling the flow of refrigerant through said condensing portion, said circuit having a quantity of refrigerant therein of a larger liquid volume than the volumetric capacity of said condensing portion, and a conduit positioned in the secondary system between the inlet of the secondary condenser and the outlet side of said heat absorbing portion and between the inlet of said heat absorbing portion and the outlet side of said valve.

2. Refrigerating apparatus comprising, a cabinet having a food storage compartment, a refrigerant evaporator coil arranged in heat exchange relationship with and to cool said food storage compartment including a moisture collecting section of the coil disposed within the compartment and a section connected in parallel therewith and disposed outside of said compartment, means for draining the moisture collected by said moisture collecting section from said compartment, a condenser communicatively connected to said evaporator to provide in part a refrigerant medium circulatory system, a valve in the circulatory system ahead of the inlet to said evaporator and responsive to a condition of the refrigerant to maintain a desired temperature of said evaporator, and a bleed conduit connected to the system ahead of said condenser and ahead of said evaporator with respect to direction of flow of the refrigerant in the circulatory system.

3. Refrigerating apparatus comprising, a pair of laterally positioned refrigerant evaporator sections, a third refrigerant evaporator section, a manifold common to said laterally positioned evaporator sections and to said third evaporator section, a heat exchanger condenser connected to said manifold for supplying liquid refrigerant thereto and having an inlet connected to outlets of said evaporator sections, a pressure responsive valve communicatively connected to and between said heat exchanger condenser and said manifold, and a bleed conduit communicatively connected to said manifold posterior to said valve and anterior of said manifold and connected to said condenser anterior of said evaporator sections with respect to direction of flow past said valve and condenser.

References Cited in the file of this patent

UNITED STATES PATENTS

| | | |
|---|---|---|
| 2,138,612 | Philipp | Nov. 29, 1938 |
| 2,154,299 | Bixler | Apr. 11, 1939 |
| 2,353,240 | Huggins | July 11, 1944 |
| 2,491,105 | Gaugler | Dec. 13, 1949 |
| 2,665,558 | Fiene | Jan. 12, 1954 |